United States Patent [19]

Borsboom et al.

[11] Patent Number: 5,605,231
[45] Date of Patent: Feb. 25, 1997

[54] FOOD DELIVERY CONTAINER

[75] Inventors: Anthonius H. Borsboom, Lenox; Anthony Giordano, Boston, both of Mass.

[73] Assignee: The Green Partnership Inc., Toronto, Canada

[21] Appl. No.: 391,860

[22] Filed: Feb. 22, 1995

Related U.S. Application Data

[63] Continuation-in-part of Ser. No. 276,583, Jul. 18, 1994, abandoned.

[51] Int. Cl.⁶ ................................................ A45C 11/20
[52] U.S. Cl. ...................... 206/551; 206/204; 206/459.5; 426/119; 426/128; 229/902; 229/906
[58] Field of Search ................................ 206/45.32, 204, 206/459.5, 551, 557; 220/4.21, 4.24, 366.1, 367.1, 373, 752, 756, 771; 426/119, 128; 229/902, 904, 906, 406, 407

[56] References Cited

U.S. PATENT DOCUMENTS

| 2,289,037 | 7/1942  | Poglein ............................ 220/771 |
| 3,303,964 | 2/1967  | Luker .............................. 229/406 |
| 3,933,295 | 1/1976  | Congleton ....................... 229/406 |
| 3,938,726 | 2/1976  | Holden Jr. ...................... 229/406 |
| 4,058,214 | 11/1977 | Mancuso ......................... 426/128 |
| 4,206,845 | 6/1980  | Christian ........................ 220/4.21 |
| 4,360,118 | 11/1982 | Stern .............................. 220/4.24 |
| 4,373,636 | 2/1983  | Hoffman ......................... 426/128 |
| 4,390,113 | 6/1983  | Bird ............................... 220/366.1 |
| 4,753,351 | 6/1988  | Guillin ........................... 229/406 |
| 4,765,463 | 8/1988  | Chanel ............................ 206/557 |
| 4,811,846 | 3/1989  | Bottega ........................... 206/551 |
| 4,813,543 | 3/1989  | Goldberg ........................ 426/119 |
| 4,823,955 | 4/1989  | Apps ............................... 220/771 |
| 4,865,219 | 9/1989  | Logan et al. ................... 206/557 |
| 4,892,213 | 1/1990  | Mason, Jr. ...................... 220/771 |
| 5,176,930 | 1/1993  | Kannankeril et al. .......... 206/204 |
| 5,377,860 | 1/1995  | Littlejohn et al. .............. 220/4.21 |
| 5,385,292 | 1/1995  | Labianca et al. ............... 206/204 |

FOREIGN PATENT DOCUMENTS 63-29923  2/1988  Japan ................................ 206/459.5

*Primary Examiner*—David T. Fidei
*Attorney, Agent, or Firm*—Bereskin & Parr

[57] ABSTRACT

A re-usable pizza delivery box comprises upper and lower dish-shaped plastic mouldings that snap together. Vent openings are provided between the mouldings to that moisture can escape. The mouldings are of circular shape in plan so that they can be turned with respect to one another to vary the vent area.

23 Claims, 9 Drawing Sheets

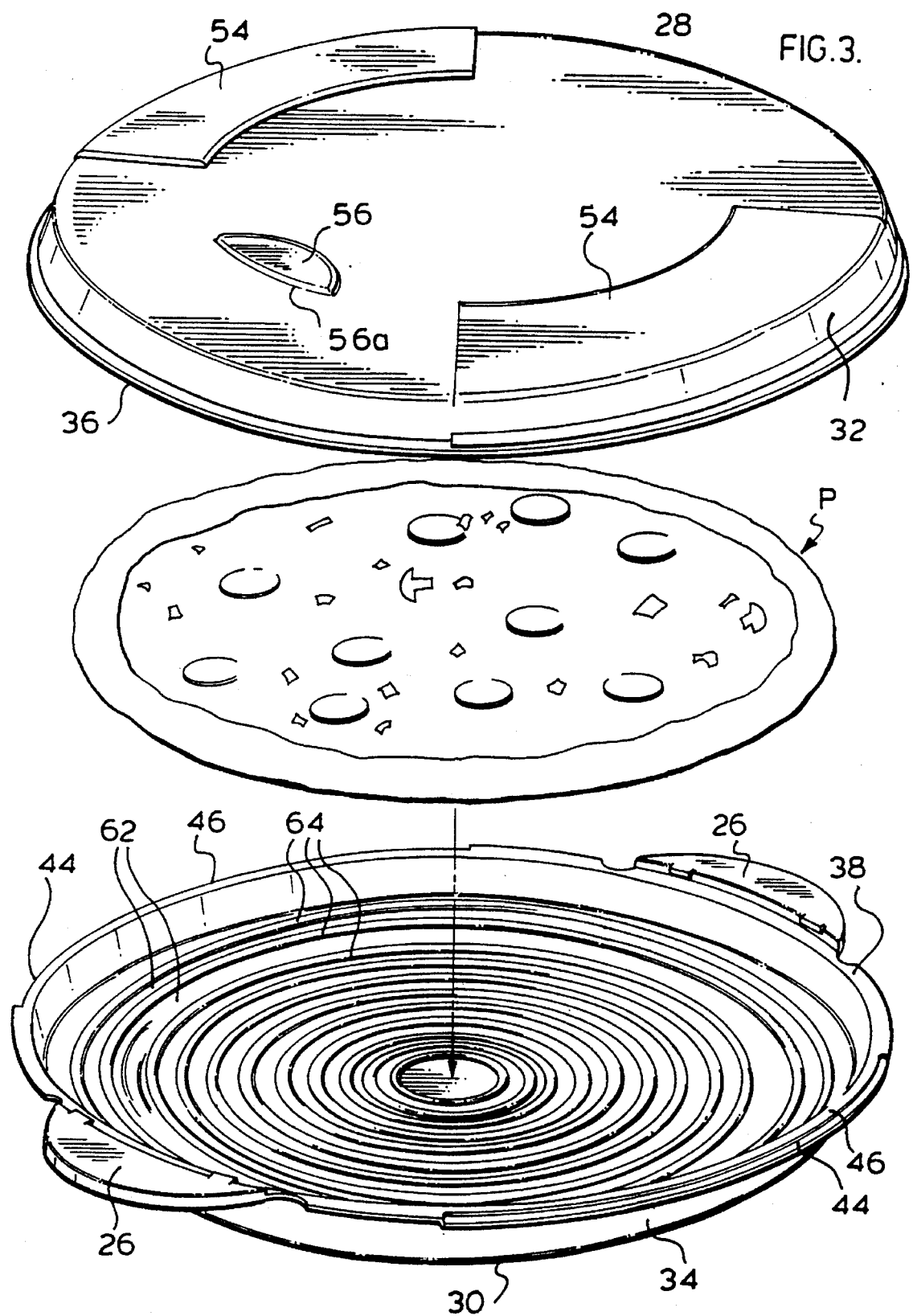

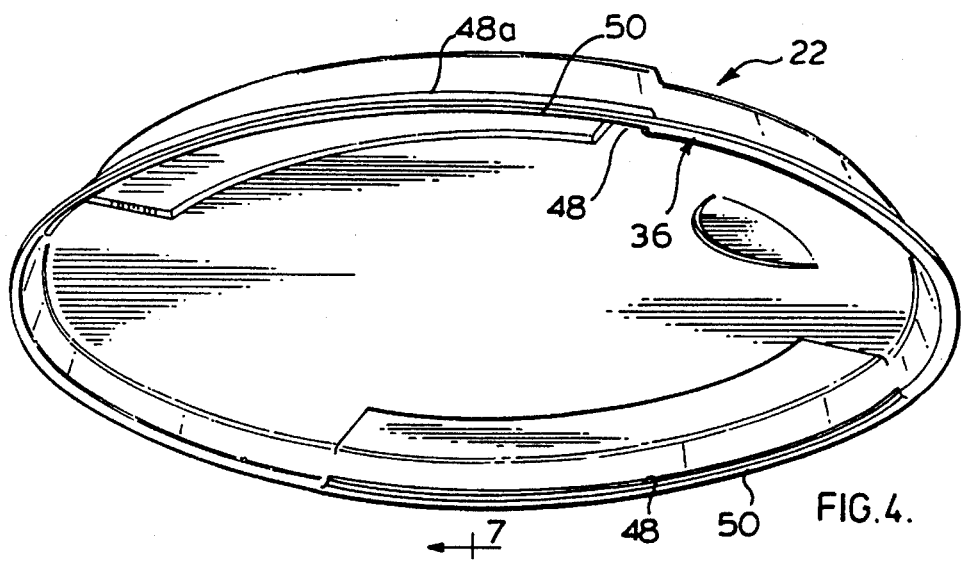
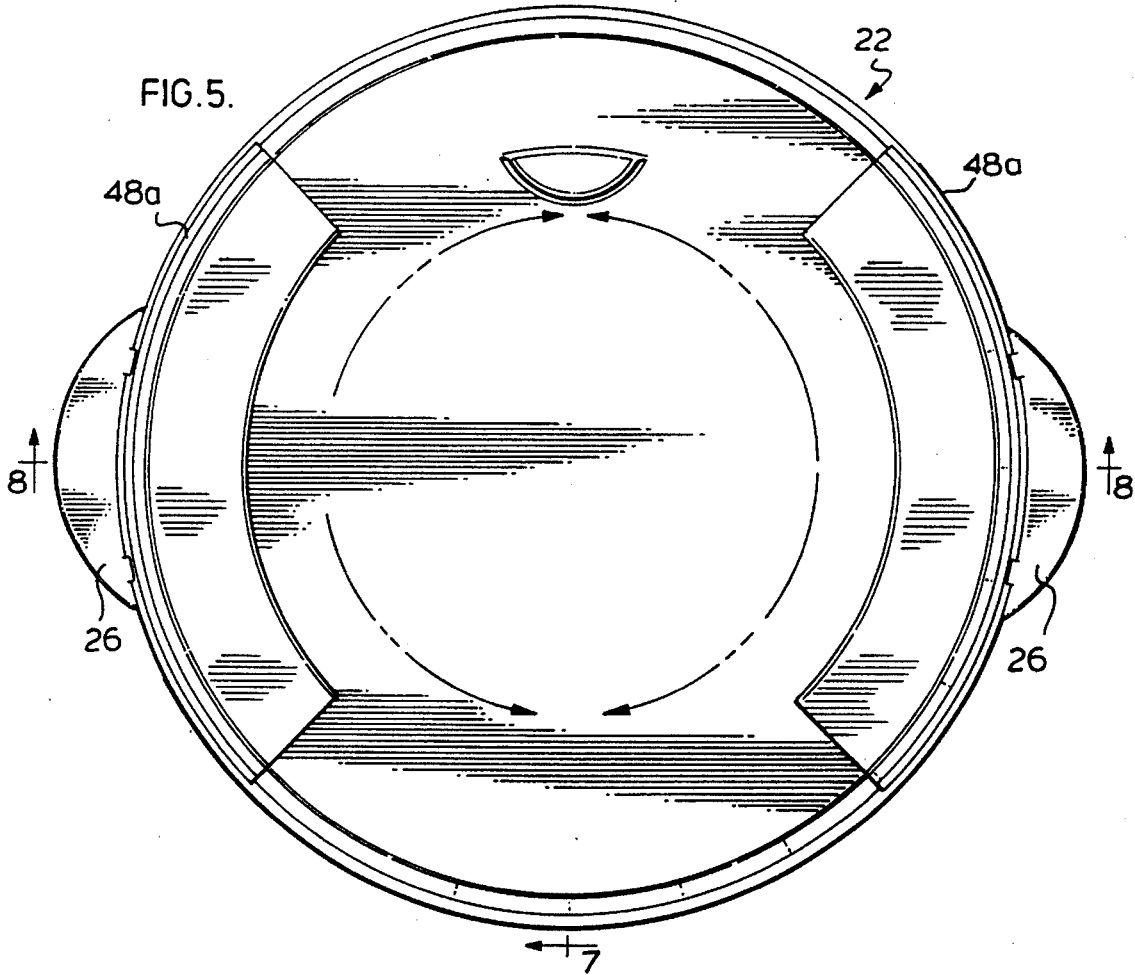

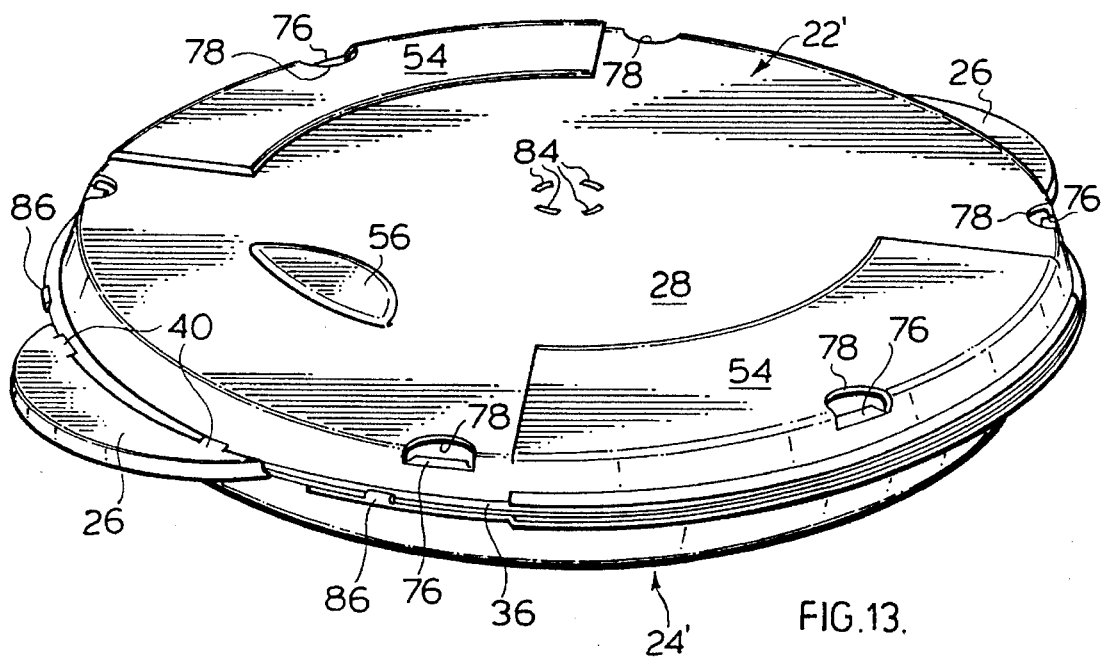
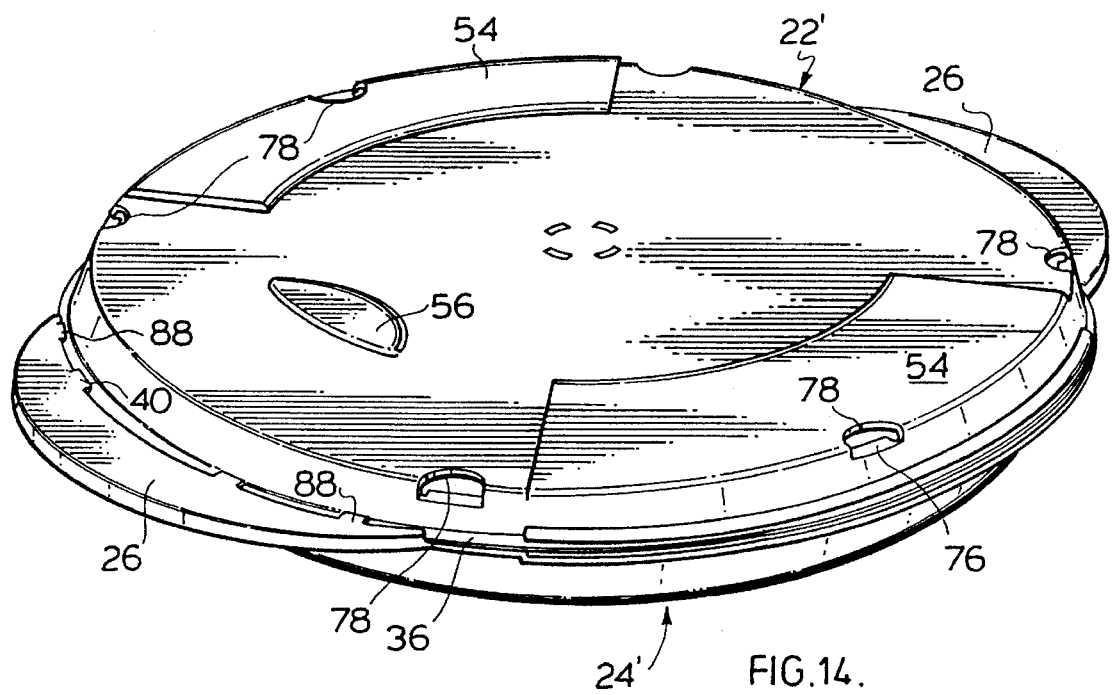

FOOD DELIVERY CONTAINER

CROSS REFERENCE TO RELATED APPLICATIONS

This application is a continuation-in-part of U.S. patent application Ser. No. 08/276,583 filed Jul. 18, 1994, now abandoned.

FIELD OF THE INVENTION

This invention relates generally to containers for foods and is concerned more particularly with containers that can be used to package food items such as pizzas for delivery or take-out from restaurants or other food suppliers to consumers.

BACKGROUND OF THE INVENTION

A delivery container for pizza, for example, typically comprises a rectangular or other polygonal-shaped box of treated cardboard, having a hinged lid. While this type of container has low initial cost, there are several disadvantages. From an ecological viewpoint, containers of this type are intended for single use only and are thrown away as garbage once the pizza has been consumed. Considered cumulatively and on a global basis, this represents a huge waste of resources, both in terms of the raw materials used to make the boxes, and in terms of the load on garbage collection facilities and waste disposal sites. From the consumers' viewpoint the container is awkward and when opened takes up double the space it takes up when closed. Lastly, from the food suppliers' viewpoint the containers are inefficient and consume considerable store space because of their lack of "nestability".

Similar problems apply in principle with other types of food delivery containers such as polystyrene boxes. Containers of this type are typically used, for example, for delivering oriental food and for hamburgers.

BRIEF DESCRIPTION OF THE INVENTION

An object of the present invention is to provide a food delivery container that addresses these problems of the prior art.

Accordingly, in one aspect, the invention provides a reusable food delivery container which comprises upper and lower container sections shaped to co-operate and define an enclosure for receiving a food item to be delivered in the container. The sections are made from a plastic or other durable light material which is selected to withstand a maximum food temperature, and to permit cleaning of the container sections after use, to a standard sufficient to permit the sections to be re-used for subsequent deliveries of food items.

Rather than being discarded after only one use, the intention is that the container provided by the invention will be returned for re-use, usually to the same food supplier or delivery service. Normally, the container will remain the property of the supplier or delivery service. For example, the consumer may be required to pay a small deposit for the first container delivered or taken out. Thereafter, when the next delivery is made, the first container will be exchanged by the delivery person for a second one and the original one will be returned to the supplier for cleaning and subsequent re-use. The process of exchange can be repeated multiple times until the container is no longer fit for re-use.

Of course, the supplier or delivery service must have access to facilities to clean and sanitize the used containers to a level sufficient to satisfy health regulations.

While the upper and lower container sections could be hinged together, they are preferably separate and arranged to interfit to form the container. The lower container section may be shaped to provide in effect a tray-like section from which the food can be served. The respective container sections preferably are designed to nest with other similar such sections so that a stack of upper sections can be stored together and a stack of lower sections can be stored together.

The container sections may be designed so that the upper section can be inverted and the lower section nested therein during serving of a food item from the lower section.

Provision preferably is made for venting from the container of moisture given off by the food. This can be accomplished by providing perforations in one or both container sections or by arranging for venting to take place between the container sections themselves. The amount of venting can be fixed or variable.

In principle, the container may be of any geometric shape as seen in plan. However, a circular shape is probably preferred, at least for pizza containers. A circular shape also has the advantage of avoiding crevices in which food particles can accumulate.

BRIEF DESCRIPTION OF DRAWINGS

In order that the invention may be more clearly understood, reference will now be made to the accompanying drawings which illustrate a particular preferred embodiment of the invention by way of example, and in which:

FIG. 3 is an exploded perspective view of the container of FIGS. 1 and 2, showing a pizza between the two container sections;

FIG. 4 is an underneath perspective view of the upper container section;

FIG. 5 is a plan view similar to FIG. 2 but showing the upper container section as having been turned with respect to the lower container section to vary the vent area of the container;

FIG. 13 is a view similar to FIG. 1 showing a pizza delivery container having modified upper and lower container sections;

FIG. 14 is a view similar to FIG. 13 showing the upper container section of FIG. 13 in combination with a further modified form of lower section;

DESCRIPTION OF PREFERRED EMBODIMENTS

Figure 1:
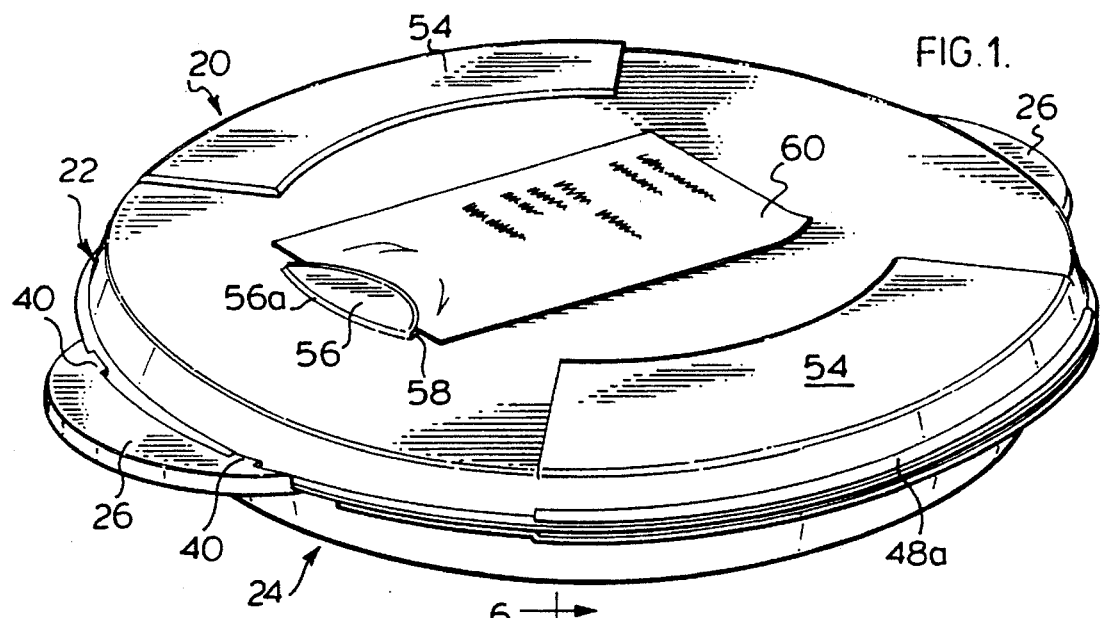
FIG. 1 is a perspective view from above of a pizza delivery container in accordance with the invention.

Referring first to FIG. 1, a pizza delivery container or "pizza box" is generally denoted by reference numeral 20 and comprises upper and lower container sections 22 and 24 respectively. The terms "lid" and "tray" are sometimes used herein to denote the respective sections 22 and 24.

As can be seen, the two container sections are in this embodiment of circular shape in plan. The tray is provided with a pair of handles 26 which are disposed at diametrally opposed locations and are generally crescent-shaped.

Referring primarily to FIG. 3, the two container sections are generally dish-shaped plastic mouldings that are designed to interfit and define an enclosure 28 (see e.g. FIGS. 6 and 7) for receiving the pizza (denoted "P"). The sections are made from a plastic material which is selected to withstand a maximum temperature to which the pizza may have been heated prior to being placed in the container, and which permits cleaning of the container sections to a standard sufficient to allow the sections to be re-used for subsequent deliveries of other pizzas.

Examples of suitable plastic materials are engineered thermoplastic resins and commodity resins. Materials of the type sold under the trade marks CYCOLAC, NORYL, ULTEM and LEXAN, and polypropylenes may be suitable.

The container may have an overall diameter of about 40 cm, the lid a depth of about 2 cm and the tray a depth of about 3 cm. The wall thickness of the plastic material may be about 2 mm. Using these approximate dimensions, mouldings in any of the aforementioned materials, for example, are relatively rigid and provide a container that is sufficiently robust to stand up to repeated re-use.

Figure 10:
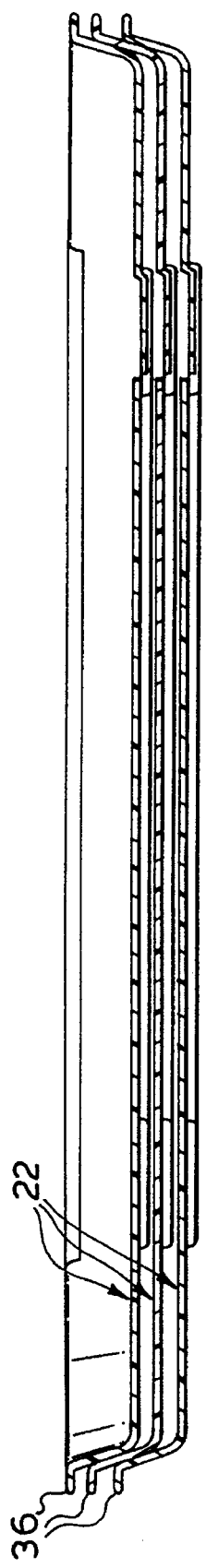
FIGS. 10 and 11 are vertical sectional views showing, respectively, upper and lower container sections "nested" with other similar such sections.
Figure 11:
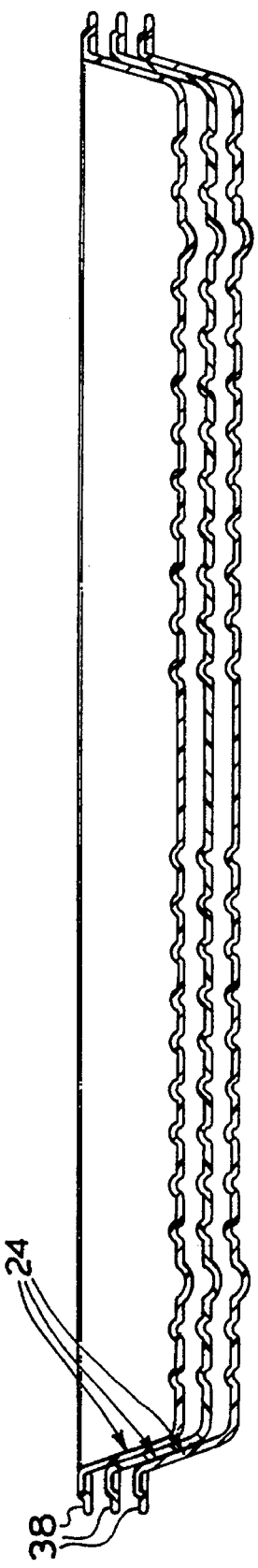
Figure 12:
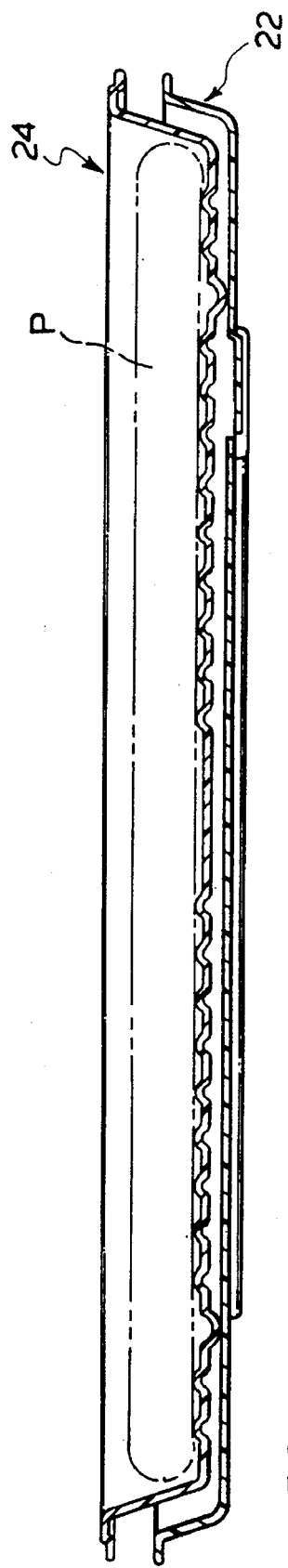
FIG. 12 is a vertical sectional view showing a lower container section nested within an inverted upper section for serving of pizza from the lower section.

The two plastic mouldings have respective circular bases denoted 28 in the case of the moulding that forms the lid 22 and 30 in the case of the moulding that forms the tray 24 (see particularly FIG. 3). The bases are surrounded by respective annular sidewalls 32 and 34 that are slightly conical in shape so that the respective mouldings can be nested with other similar mouldings for compact storage. FIG. 10 shows a number of identical lids 22 nested together in this way, while FIG. 11 shows a similar stack of trays 24. The tray can also nest in the inverted lid when serving the pizza. In FIG. 12, a tray 24 is shown nested in an inverted lid 22 for serving pizza (P) from the tray.

Figure 6:
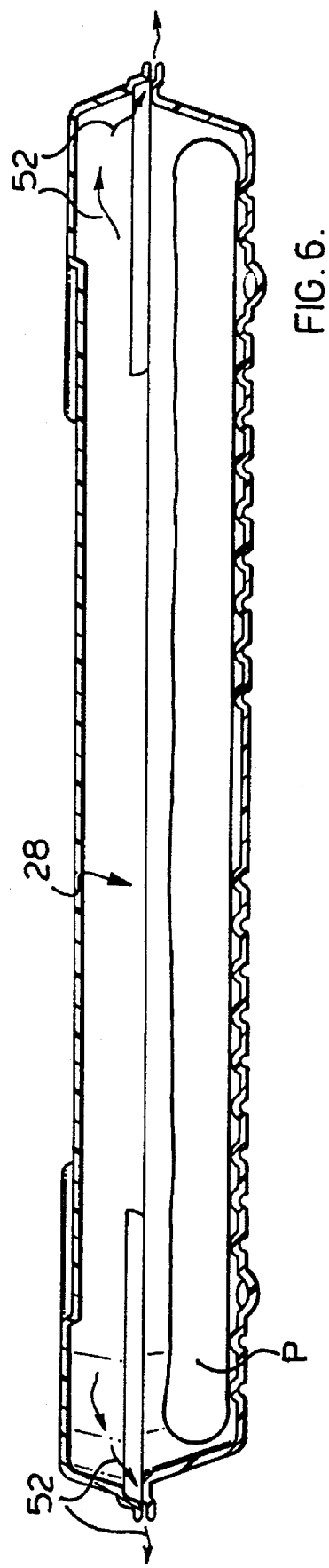
FIGS. 6 and 7 are vertical sectional views on line 6—6 of FIG. 2 and 7—7 of FIG. 5 respectively.
Figure 7:
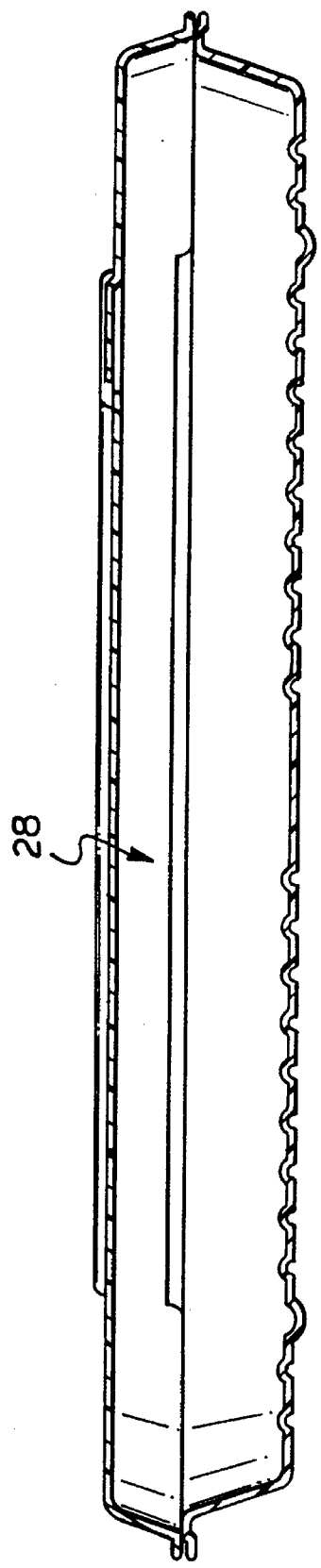
Figure 8:
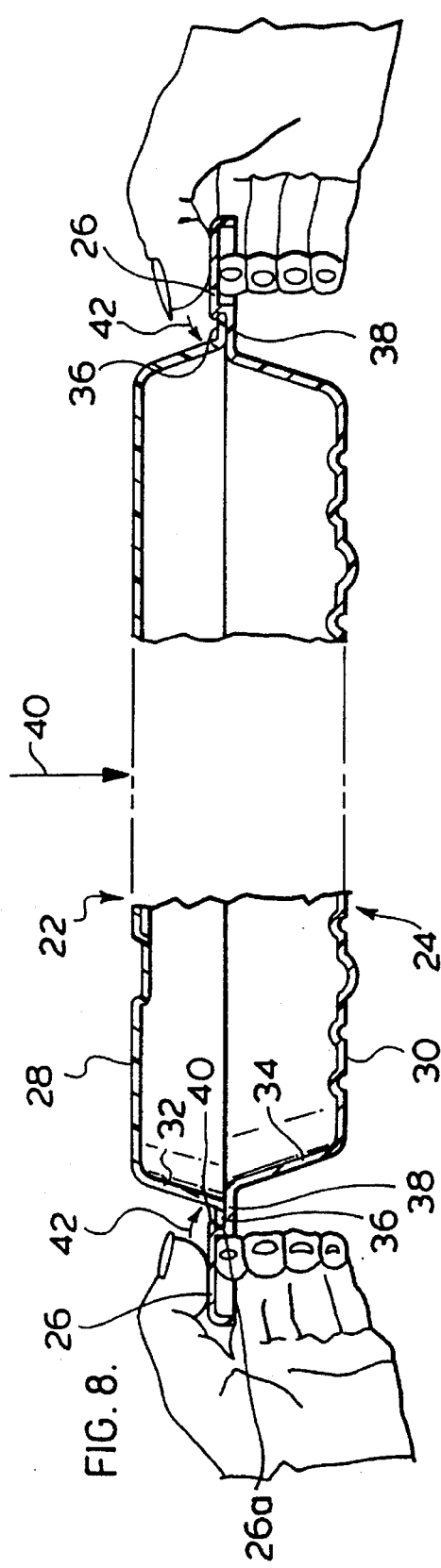
FIG. 8 is a sectional view on line 8—8 of FIG. 5 showing a person holding the container.

FIGS. 10 and 11 also show that the sidewalls 32 and 34 of the two mouldings have respective outwardly directed flanges 36 and 38. When one of the lids 22 is fitted to a tray 24, the respective flanges confront one another and lie in surface-to-surface contact as best seen in FIGS. 6 and 7. Referring to FIG. 8, the respective handles 26 on the tray 24 each includes an upward step 26a at the outer edge of the flange 36 of the lid section, and a pair of inwardly directed tabs 40 that snap over flange 36 to hold the lid in place. The two tabs on each handle are clearly visible in FIG. 2. The pairs of tabs on the respective handles in effect hold the container sections together and prevent the lid shifting laterally with respect to the tray.

FIG. 8 also illustrates that, if the container is held by the two handles 26, the weight of the pizza within the container acts downwardly indicated by arrow 40, causing the handles to tend to pivot inwardly to some extent as indicated by arrows 42, thereby bringing the tabs 40 more tightly into engagement with the lid flange 36. In other words, the weight of the pizza within the container tends to cause the tabs to more tightly grip the container lid.

An important feature of the food container provided by the invention is the provision of vent openings for releasing moisture given off by the food item within the container. This is particularly important in the case of hot food items such as pizzas and the like, where moisture otherwise tends to accumulate within the container and make the food contents soggy.

In this embodiment, vent openings are provided between the two container sections 22 and 24 and provision is made for varying the vent area. Referring to FIG. 3 by way of example, it will be seen that the flange 38 of the container tray 24 is provided with two relieved areas 44 at diametrally opposed locations, between the two handles 26. The two relieved areas 44 are symmetrical about a diametral line that bisects the two handles 26 and each area defines an arc of approximately 90° at the centre of the tray. The two relieved areas 44 are located at the outer edge of the flange 38, leaving corresponding unrelieved respective flange portions 46 along the inner edge of the flange.

As best seen in FIG. 4, the lid 22 is provided with similar relieved areas 48 in its flange 36, but extending along the inner edge of the flange, leaving unrelieved flange portions 50 along the outer edge. The relieved areas are provided by steps in the respective plastic mouldings that result in corresponding raised areas at the opposite face of the moulding, as indicated at 48a. The respective relieved areas 48 of the lid and 44 of the tray both extend over greater than half of the width (or radial extent) of the respective flanges 36 and 38 so that, if the lid and tray are positioned so that the respective relieved areas match, a vent gap or slot will be provided between the two container sections for permitting moisture to escape.

In FIG. 8, the lid and base section are shown appropriately positioned to allow such venting. Arrows 52 indicate moisture escaping. FIG. 7 shows the lid as having been turned with respect to the position of FIG. 6 to bring unrelieved portions of its flange 36 to positions above the relieved portions 44 of the tray flange 38, thereby closing off the vent openings.

Figure 2:
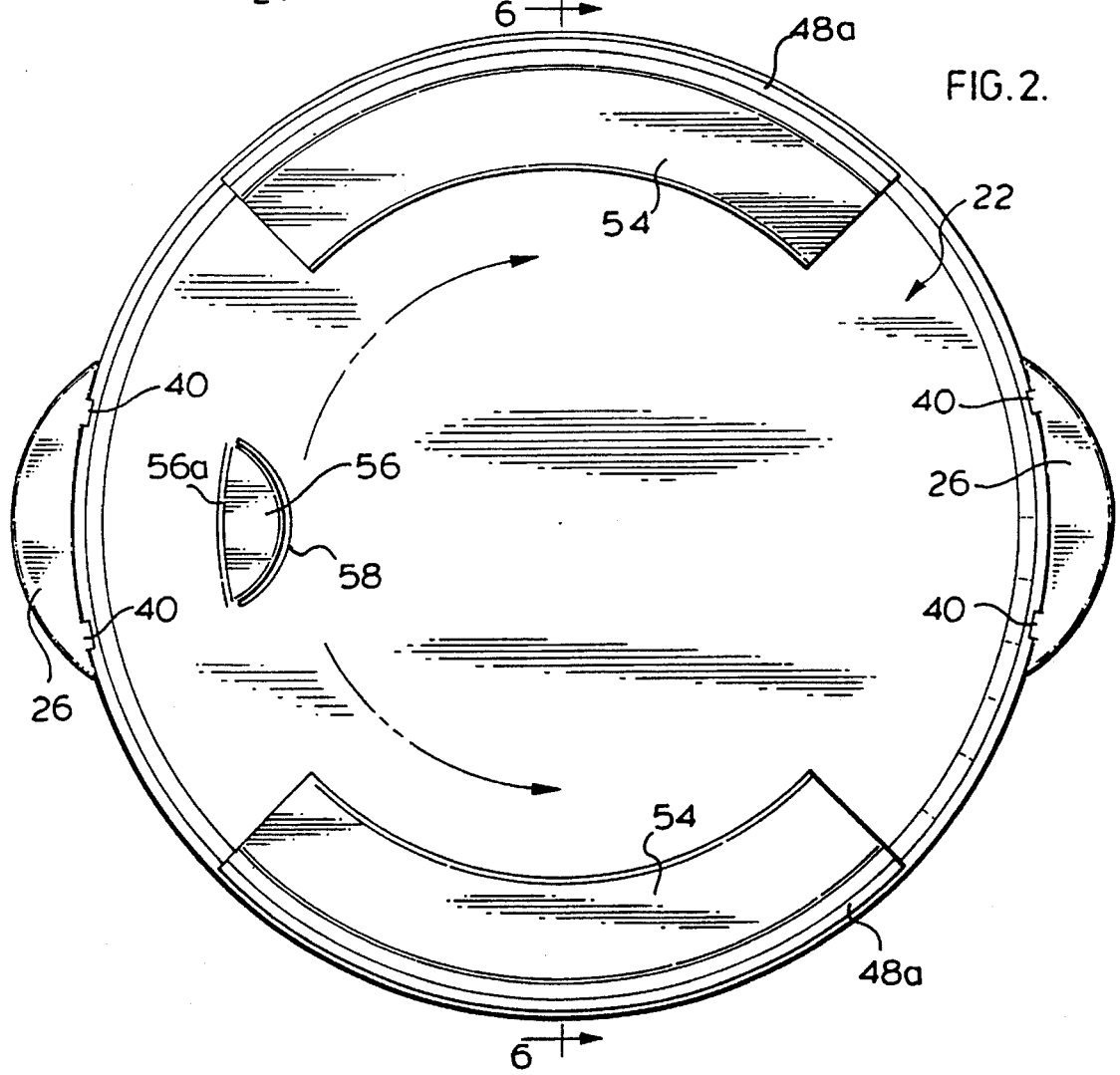
FIG. 2 is a plan view corresponding to FIG. 1.

The relieved flange areas 48 of the lid also each occupy a length of flange 36 corresponding to about 90° of arc at the centre of the lid, and are equally spaced from one another. As best shown in FIGS. 1 and 2, respective arcuate raised areas 54 are moulded into the top of the lid and are disposed above and co-extensive with the relieved areas on the underside of the flange 36. The raised areas thereby provide a visual indication of the location of the vent areas in the lid to a person holding the container. As noted previously, the vent openings 44 in the base section are disposed symmetrically with respect to the handles 26; as such, the handles provide reference points for the location of the vent openings in the base section. For example, in FIG. 2, it can clearly be seen that the lid is positioned so that its vent openings match the vent openings in the base section, for providing a maximum vent area. By turning the lid with respect to the base section, the vent area can be varied infinitely from this maximum to zero depending on the desired vent conditions. When the raised areas 54 are positioned in line with the handles 26 on the base section as shown in FIG. 5, the vent openings are completely closed, and this is apparent to the person holding the container.

FIGS. 1 and 2 also show that the lid incorporates a tab 56 that is slightly stepped upwardly with respect to the remainder of the top surface of the lid, about a line 56a. A slot 58 is provided in the lid along the line of the curved edge of tab 56 to receive an identifying sheet 60. Sheet 60 may, for example, contain advertising material, a space to indicate the particular pizza that is within the container and possibly invoice information. Sheet 60 is a separate, replaceable sheet and is frictionally held in place by tab 56 and slot 58. The extent of the slot and the height to which the tab 56 is stepped is selected to provide the required gripping action.

The base 30 of the tray 24 is provided with a series of raised concentric circular ribs 62 and intervening channels 64 (see FIG. 3). It can be seen from FIG. 9 for example that these ribs and channels are moulded into the bottom surface of the tray. As compared with a tray that had a flat bottom surface, these ribs raise the pizza P, providing small air spaces 66 that help insulate the pizza against heat loss to the outside. At the same time, the channels 64 allow some space to accommodate any moisture that may drain from the pizza or condense within the container.

Figure 9:
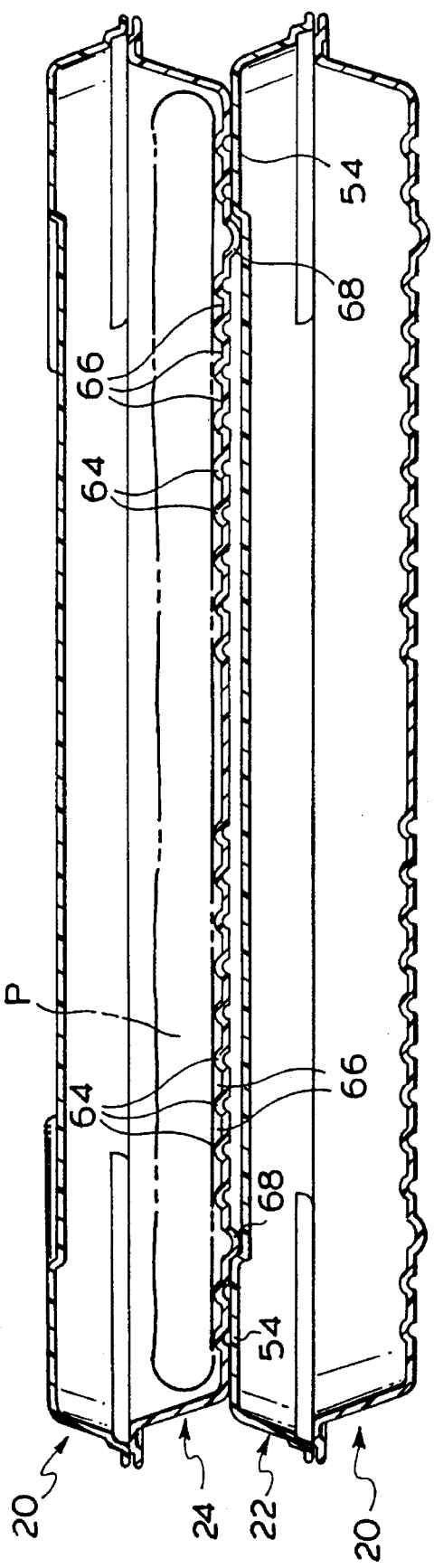
FIG. 9 is a sectional view similar to FIG. 8 but showing two complete containers stacked one on top of the other.

FIG. 9 illustrates the fact that there is also a concentric circular rib (denoted 68), that extends downwardly and protrudes from the bottom face of tray 24. This rib is designed to be complementary to the raised arcuate areas 54 on the top surface of the lid. Complete containers can then be stacked on top of one another and are restrained against relative lateral movement by the engagement of rib 68 at the bottom of one container with the arcuate raised areas 54 at the top of the container below.

Reference will now be made to FIGS. 13 to 17 in describing a number of possible modifications of the pizza box shown in FIGS. 1 to 12. In each of FIGS. 13 to 17, the lid of the box is modified as compared with the previous views and is denoted by reference numeral 22'. FIG. 13 shows a first modified form of tray, denoted 24' while FIG. 14 shows a second modified form of tray denoted 24". The modifications will be described in detail below. It is to be understood that, except for the modifications, the tray and lid and the various parts of these components are the same as in FIGS. 1 to 12; accordingly, the same reference numerals have been used.

Figure 15:
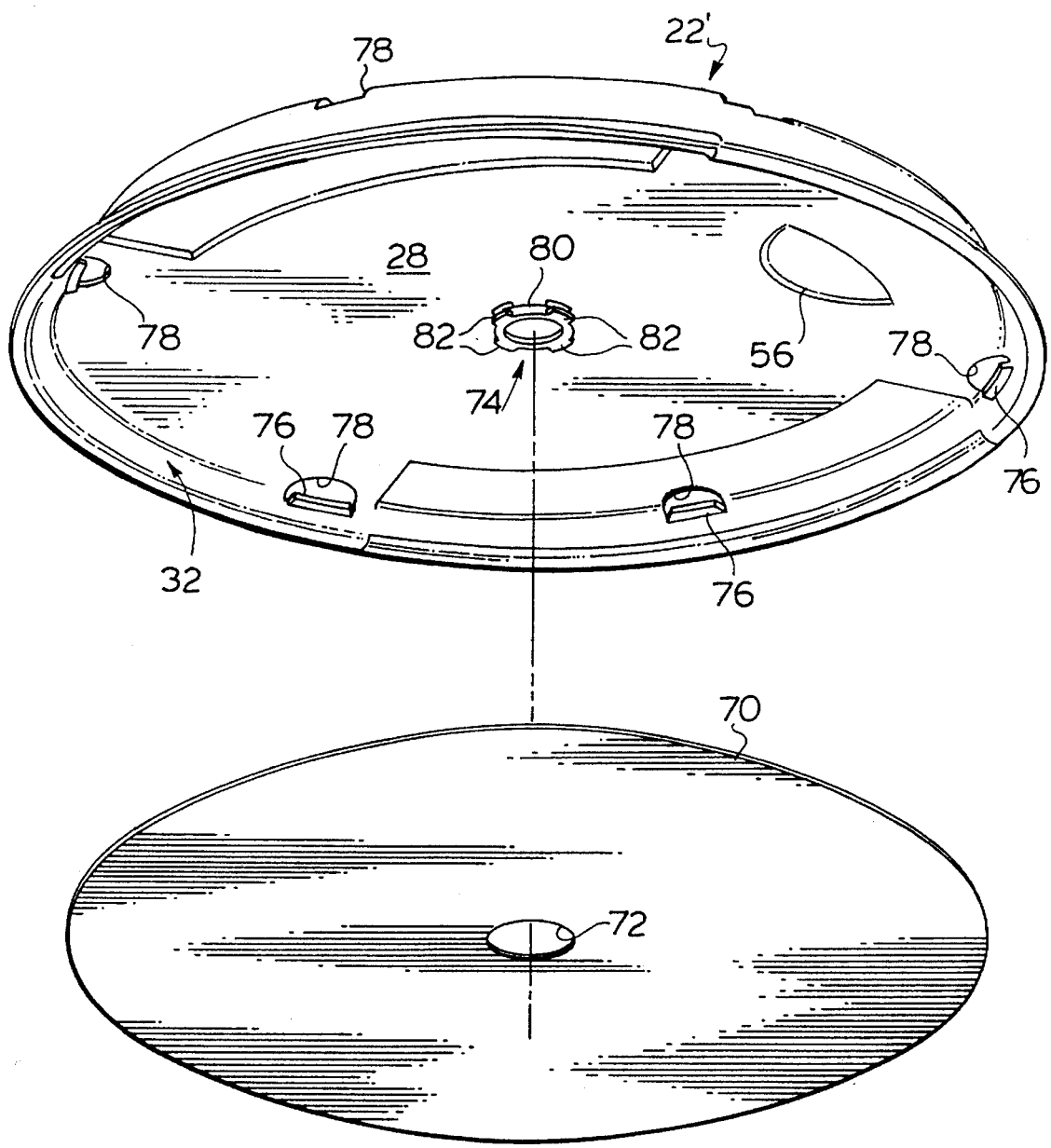
FIG. 15 is an exploded perspective view from below of the upper container section shown in FIGS. 13 and 14.

A primary objective of the modified lid 22' is to allow incorporation of a moisture transparent/moisture absorbent liner intended to prevent moisture appearing on the pizza within the container, or within the tray or lid of the container itself. In FIG. 15, the liner is shown in an exploded position below the modified lid 22', and is denoted by reference numeral 70. Liner 70 is essentially a paper disc made from a grade and thickness of paper designed to provide the required moisture transparency and absorbency, coupled with food compatibility. The liner is of course designed to be replaceable so that it can be changed for each new pizza.

Figure 16:
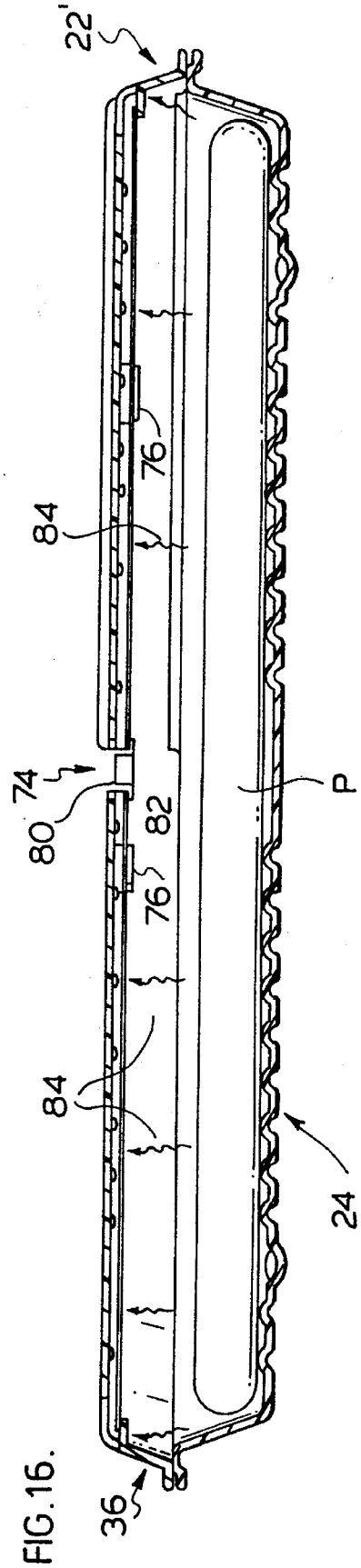
FIG. 16 is a vertical sectional view through the container of FIG. 13, with a pizza shown in place in the container; and, FIG. 17 is a view similar to view 16 showing the lid after it has been removed and inverted.
Figure 17:
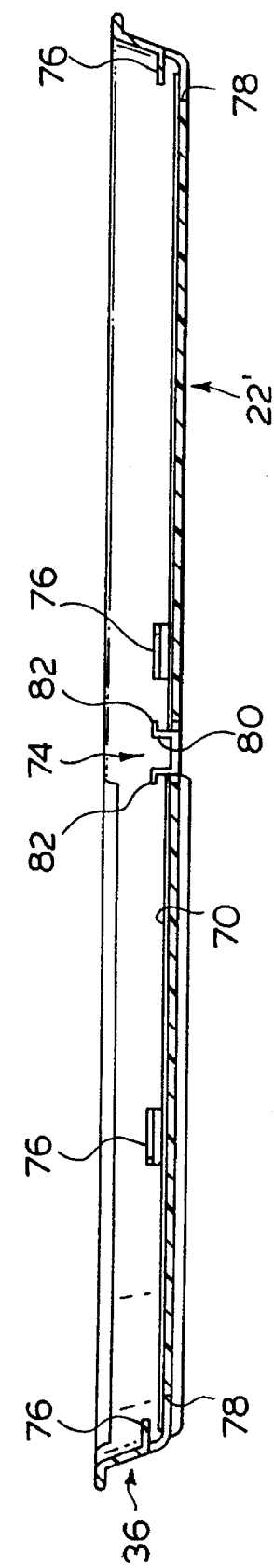

Lid 22' is provided with means for temporarily retaining the liner within the lid and holding it clear of the pizza, as best shown in FIG. 16. When the lid has been removed from the tray, it can be inverted as shown in FIG. 17 and the retaining means will then allow the liner to "settle" onto the inner surface of the lid and absorb any moisture that may have condensed on that surface. This is illustrated in FIG. 17. At the same time, the retaining means allow ready removal and replacement of the liner, each time the pizza box is re-used.

It will of course be appreciated that the liner retaining means may take a number of different forms. Preferably, there should be a retaining effect both at the center of the liner and at its perimeter. FIG. 15 best illustrates a particular preferred form of retaining means. In this case, the liner 70 has an external diameter selected to be at least substantially equal to the diameter of the circular base 28 of the lid 22'. The liner has a circular opening 72 at the center. Lid 22' is provided with a central liner retaining post 74, over which the liner can be fitted (via the center opening 72), and by which the liner is retained in its center region, and with a series of inwardly directed lips 76 designed to engage the margin of the liner and retain the liner around its circumference. The lips 76 are formed by small ledges that extend inwardly from the annular side wall 32 of the lid 22', so that the liner can be engaged above and then supported by the lips, as best shown in FIG. 16.

FIGS. 13 and 14 show that, above each of the lips 76, there is a semi-circular opening in the base 28 of the lid. No liner is shown in those views but it will be appreciated that, when a liner is in place, the openings allow visual observation of the liner and confirmation of the fact that the liner is correctly engaged with the lips. The openings also allow for some venting of moisture from the container, and provide an interesting design feature. During manufacture of the lid, the openings accommodate mould inserts used in forming the lips.

Referring back to FIG. 15, the central liner retaining post 74 comprises an annular post member 80 which extends outwardly from the center of the base 28 of the tray 22'. The post member has a series of radially projecting flange portions 82 at its outer end. The central opening 72 in the liner is slightly larger than the external diameter of the post member 80. The flange portions 82 of the post are dimensioned and spaced from the surface of the base 28 of tray 22' sufficient to allow the liner to be easily manipulated and fitted over the post, around the flange portions 82. As best seen in FIG. 17, when the liner is in place, and the lid is fitted to the tray of the container, the flange portions 82 support the liner in the region around opening 72. The lips perform a similar function at the perimeter of the liner.

FIG. 16 shows a pizza P in place within the container and the arrows denoted 84 represent moisture which is given off by the pizza, and which permeates into and is absorbed by the liner. FIG. 17, then, shows the lid 22' having been removed from the tray 24' and inverted. The liner 70 is shown to have "settled" away from the lips 76 and flange portions 82 and lies essentially flat on the inner surface of the base 28 of the lid 22', where it can absorb any moisture that may have accumulated within the lid. Clearly, the liner can simply be grasped and torn out of the lid, and discarded, allowing the tray and lid to be sterilized prior to subsequent reuse.

Four arcuate-shaped openings 84 are visible in the center region of the base 28 of the tray 22', in the area of the liner retaining post 74. These openings allow access of mould insert parts necessary for forming the flange portions 82 on the post (FIG. 15). The openings also provide a design detail on the lid.

As noted previously, FIGS. 13 and 14 also show modified versions of the tray of the pizza box. The version shown in FIG. 13 (denoted 24') is essentially the same as the version shown in the previous views except for the two additional clip formations 86 that are provided one on each side of each of the handles 26 and spaced outwardly therefrom to engage over part of the outwardly directed flange 36 of the lid, for providing additional security of retention of the lid on the tray.

FIG. 14 shows what is essentially a different way of achieving the same objective. In that case, each of the handles 26 is extended laterally as compared with the handles in the first embodiment, and instead of only one pair of tabs 40 for engaging the lid, two pairs are provided. In FIG. 14, the two existing tabs are denoted 40 and two additional tabs in extended portions of the handle 26 are denoted 88.

It will of course be understood that the preceding description relates to particular preferred embodiments of the invention and that many modifications are possible. Some of those modifications have been indicated previously and others will be apparent to a person skilled in the art.

Clearly, the particular materials referred to and dimensions given are examples only and are not to be considered to as limiting. The material used to make the container sections will depend on the particular food item to be contained and on the maximum surface temperature likely to be attained by that item. A cooked pizza for example might have a maximum surface temperature of, say, 170° F. The material should then have a softening point greater than 170° F. In other applications the food might not be heated at all. Examples of suitable non-plastic materials include ceramics and aluminum alloys.

The material selected must of course be of a type which is approved for use in contact with food.

Possible alternative shapes have been suggested. In a non-circular shape it obviously would be impossible to allow for turning of the lid with respect to the tray to vary the vent area in a continuous manner. However, it would be possible to provide for defined alternative positions of the lid with respect to the tray, which could achieve a similar effect. For example, in a square configuration, the lid could be fitted to the tray in either of two alternative positions, one of which would provide for a maximum vent area and the other of which would provide for no vent area. Vents could be provided in other ways, for example, by simple perforations in the lid and/or tray.

It is also to be understood more generally that the term "food delivery container" is to be interpreted broadly. The actual "delivery" may be undertaken, for example, by a restaurant or other food supplier, by a delivery service on behalf of the food supplier, or by the consumer on a "take-out" basis. Another possibility is that the container might be used for deliveries within an institution such as a hospital, hotel or school.

We claim:

1. A re-usable food delivery container comprising upper and lower container sections which are shaped to co-operate and define an enclosure for receiving a food item to be delivered in the container, the sections being made from a plastic material which is selected to withstand a maximum food item temperature, and to permit cleanng of the container sections after use, to a standard sufficient to permit the sections to be re-used for subsequent deliveries of food items;

wherein the upper and lower container sections comprise respective dish-shaped plastic mouldings which are designed to interfit with one another to form said enclosure, and each of which has a base, a sidewall which extends upwardly from the base and terminates in an outer edge, and a flange which extends outwardly from said outer edge, the mouldings being adapted to interfit with one another with said flanges in confronting and co-operating relationship;

wherein said flanges of the respective plastic mouldings have relieved areas which can co-operate to define vent means between the mouldings for permitting escape of moisture from said enclosure, the upper and lower container sections being adapted to interfit with one another in at least two relative positions in which the mouldings are differently angularly oriented with respect to one another, in one of which positions said relieved areas co-operate to define a maximum vent area and in the other of which positions the vent is closed;

wherein said plastic mouldings are of circular shape in plan and said flanges are annular and concentric with the respective mouldings, whereby the mouldings can be turned with respect to one another to infinitely vary the extent of co-operation of said relieved areas and hence the vent area;

wherein the flange of each moulding is provided with two said relieved areas, said areas being equally spaced from one another and each extending over approximately 90° of arc with respect to said circular shape, whereby the mouldings can be turned with respect to one another through 90° from positions in which the relieved areas define a said maximum vent area occupying approximately 180° of arc to said position in which the vent is closed.

2. A re-usable food delivery container comprising upper and lower container sections which are shaped to co-operate and define an enclosure for receiving a food item to be delivered in the container, the sections being made from a material which is selected to withstand a maximum food item temperature, and to permit cleaning of the container sections after use, to a standard sufficient to permit the sections to be re-used for subsequent deliveries of food items, wherein said upper container section is adapted to receive a replaceable liner which is capable of absorbing moisture given off by said food item, and is provided with means for retaining the liner clear of the food item, wherein said upper and lower container sections comprise respective dish-shaped plastic mouldings which are designed to interfit with one another and form said enclosure, wherein said plastic mouldings are of circular shape in plan, each comprising a circular base, and a sidewall which extends outwardly from the base, and wherein said liner retaining means comprises a post at the center of said circular base, including means for engaging the liner, and liner support elements spaced around said sidewall for engaging a marginal portion of said liner, the liner having a circular shape corresponding to the shape of said base, with an opening at the center for receiving said post.

3. A re-useable food delivery container as claimed in claim 2, wherein said sidewall of each of said dish-shaped mouldings extends upwardly from the base and terminates in an outer edge, and a flange extends outwardly from said outer edge, and wherein when the mouldings interfit with one another said flanges are in confronting and co-operating relationship.

4. A re-useable food delivery container as claimed in claim 3, wherein said flanges of the respective plastic mouldings have relieved areas which can co-operate to define vent means between the mouldings for permitting escape of moisture from said enclosure, and wherein the upper and lower container sections are adapted to interfit with one another in at least two relative positions in which the mouldings are differently angularly oriented with respect to one another, in one of which positions said relieved areas co-operate to define a maximum vent area and in the other of which positions the vent is closed.

5. A re-useable food delivery container as claimed in claim 4, wherein said flanges are annular and concentric with the respective mouldings, whereby the mouldings can be turned with respect to one another to infinitely vary the extent of co-operation of said relieved areas and hence the vent area.

6. A re-useable food delivery container as claimed in claim 5, wherein the flange of each moulding is provided with two relieved areas, said areas being equally spaced from one another and each extending over approximately 90° of arc with respect to said circular shape, whereby the mouldings can be turned with respect to one another through 90° from positions in which the relieved areas define a maximum vent area occupying approximately 180° of arc to a position in which the vent is closed.

7. A re-useable food delivery container as claimed in claim 5, wherein the base of the lower container sections has an inner surface provided with a series of concentric raised ribs and intervening grooves, which serve to provide air spaced below the food item and areas clear of the food item for receiving moisture therefrom.

8. A re-usable food delivery container as claimed in claim 2, wherein said liner is a moisture-transparent and moisture-absorbent paper.

9. A re-usable food delivery container as claimed in claim 1, further comprising vent means for permitting escape of moisture from said enclosure.

10. A re-usable food delivery container as claimed in claim 1, wherein said sidewalls are inclined outwardly with respect to the base so that a plurality of each of said upper and lower container sections can be nested within one another for storage.

11. A re-usable food delivery container as claimed in claim 10, wherein the respective mouldings are designed so that a lower container section can be nested within an inverted upper container section for serving of food from the lower container section.

12. A re-usable food delivery container as claimed in claim 1, wherein said lower container section has a pair of handles extending outwardly from said flange at opposite sides of the container.

13. A re-usable food delivery container as claimed in claim 8, wherein said handles are provided with tabs which snap-fit over the flanges on the upper container section to hold the two container sections together.

14. A re-usable food delivery container as claimed in claim 9, wherein said handles are coupled to said lower container section so as to be capable of deflecting with respect to the container section in response to the weight of a food item in the container, thereby urging said tabs into engagement with the flange of the upper container section.

15. A re-usable food delivery container as claimed in claim 1, wherein the upper container section is provided with means for visually identifying the locations of the relieved areas.

16. A re-usable food delivery container as claimed in claim 15, wherein the upper container section has a top surface provided with a pair of arcuate-shaped raised areas which are aligned with and provide said means for visually identifying the locations of said relieved areas, the raised areas being disposed in a marginal region of said top surface and having arcuate inner edges concentric about the centre of said top surface.

17. A re-usable food delivery container as claimed in claim 16, wherein the lower container section has a bottom surface provided with a protuberant rib which is arranged to co-operate with the arcuate inner edges of the raised areas on the top surface of the upper container section, whereby a plurality of similar containers can be stacked one on top of another and adjacent containers in the stack are located against lateral movement with respect to one another, by co-operation of the protuberant rib on the bottom surface of an upper container with the said raised areas on the top surface of the container below.

18. A re-usable food delivery container as claimed in claim 1, wherein the base of the lower container section has an inner surface provided with a series of concentric raised ribs and intervening grooves, which serve to provide air spaces below the food item and areas clear of the food item for receiving moisture therefrom.

19. A re-usable food delivery container as claimed in claim 16, wherein said top surface of the upper container section is provided with a raised tab serving as a clip for retaining a label.

20. A re-usable food delivery container as claimed in claim 1, wherein said upper container section is adapted to receive a replaceable liner which is capable of absorbing moisture given off by said food item, and is provided with means for retaining the liner clear of the food item.

21. A re-usable food delivery container as claimed in claim 20, wherein said liner is a moisture-transparent and moisture-absorbent paper.

22. A re-usable food delivery container as claimed in claim 20, wherein said upper and lower container sections comprise respective dish-shaped plastic mouldings which are designed to interfit with one another and form said enclosure, wherein said plastic mouldings are of circular shape in plan, each comprising a circular base, and a sidewall which extends outwardly from the base, wherein said liner retaining means comprises a post at the center of said circular base, including means for engaging the liner, and liner support elements spaced around said sidewall for engaging a marginal portion of said liner, the liner having a circular shape corresponding to the shape of said base, with an opening at the center for receiving said post.

23. A re-usable food delivery container as claimed in claim 22, wherein said post comprises an annular post member extending outwardly from said circular base, and a series of angularly-spaced flange portions that extend outwardly from said annular member at a spacing from said base permitting said liner to be manipulated for engagement over said post and flange portions, and wherein said circumferential liner support elements comprise a series of angularly-spaced lips that extend inwardly from said sidewall of the upper container section, said post and lips supporting the liner when the upper container section is in a normal position on top of the lower container section, but permitting the liner to move towards said circular base when the upper container section is removed from the lower container section and inverted, so that the liner will settle onto said base and absorb any accumulated moisture.

\* \* \* \* \*